United States Patent [19]

Evans

[11] 4,224,624
[45] Sep. 23, 1980

[54] DETECTION OF PROPERLY POSITIONED MOVABLE OBJECTS

[75] Inventor: Edward N. Evans, Long Beach, Calif.

[73] Assignee: Park Mobile, Inc., New York, N.Y.

[21] Appl. No.: 954,823

[22] Filed: Oct. 26, 1978

[51] Int. Cl.$^2$ .............................................. G01S 3/02
[52] U.S. Cl. ................................. 343/112 R; 340/673; 340/686
[58] Field of Search .................... 340/21, 51, 673, 686, 340/552; 343/5 PD, 112 R; 333/21 A; 324/58 A, 58 R

[56] References Cited

U.S. PATENT DOCUMENTS

| | | |
|---|---|---|
| 2,578,046 | 12/1951 | Cooper et al. . |
| 2,773,609 | 12/1956 | Holappa . |
| 2,874,822 | 2/1959 | Coursey . |
| 3,323,617 | 6/1967 | Inuzuka et al. . |
| 3,656,608 | 4/1972 | Lichti . |
| 3,877,002 | 4/1975 | Cheal et al. . |
| 4,087,746 | 5/1978 | Kanae ............................ 333/21 A |

*Primary Examiner*—Theodore M. Blum
*Attorney, Agent, or Firm*—Larson, Taylor & Hinds

[57] ABSTRACT

Electromagnetic radiation position detection system and method are disclosed for detecting when a movable object is located at a predetermined position. In a preferred embodiment, polarized microwave radiation emitted from a source fixed relative to the movable object is rotated when the object is in an aligned position and a detector fixed with respect to the movable object and located opposite the fixed source provides a signal when substantially only the rotated, polarized radiation is detected. In one particular embodiment, a plurality of conveyor pans which are part of a car parking tower is the movable object and each pan carries a waveguide which rotates the microwave radiation propagated therethrough. The conveyor pan also has a wheel well with a switch located therein and which, when depressed by the tire of a properly located car on the conveyor pan acts to block the radiation from being detected.

20 Claims, 5 Drawing Figures

DETECTION OF PROPERLY POSITIONED MOVABLE OBJECTS

FIELD OF THE INVENTION

This invention relates generally to the detection of a properly positioned movable object and more particularly relates to the use of electromagnetic radiation to determine when a movable object is in a predetermined position.

BACKGROUND OF THE INVENTION

The detection of the position of a movable object using electromagnetic radiation is known in the prior art. These systems usually contain both a source and a detector and the position of the movable object is determined by the absence of a normally detected signal. Such systems typically used light radiation and the source emits a beam of light which is detected by the detector. The position of the movable object is known when the light beam is broken by the object moving between the source and the detector. An example of a photoelectric means for detecting the presence of a vehicle in a parking garage is disclosed in the U.S. Pat. to Inuzuka et al, No. 3,323,617, incorporated herein by reference.

It is also known to use non-visible light electromagnetic radiation, ultrasonic radiation, and higher frequency electromagnetic radiation such as used in radar and microwave transmission systems. For example, the U.S. Pat. to Cheal et al, No. 3,877,002, incorporated herein by reference, discloses an intrusion detection system using microwaves.

There are a number of disadvantages to each of the prior art systems when they are used to locate when a movable object is at a predetermined position. Firstly, the use of laser beams or other light frequency electromagnetic radiation systems require very accurate alignment between the source and the detector and, even when aligned, do not provide the necessary degree of accuracy unless the movable object is specially configured. Systems using light radiation also are prone to indicate improper detection or are otherwise unreliable when the environment between the source and the detector becomes polluted. Such pollution can include fog, smog, smoke, and other light reflecting substances. Therefore, in certain environments such as found outside an enclosed structure, light radiation systems are unreliable.

The conventional systems which use ultrasonic radiation and radar and microwave radiation suffer from other disadvantages. For example, such systems can suffer from the problem of stray radiation reaching the detector, which problem becomes more pronounced as the distance between source and detector increases. In addition, it has been found by the present inventors that ultrasonic systems used outside an enclosed structure are subject to drift, environmental noise pollution, and other degradation from climatic conditions. It was even found that the sound beam was broken by a strong wind blowing the transmitted ultrasonic sound beams away from the detector.

When it is necessary to determine when each one of a plurality of movable objects is in a predetermined position, such as when each tray of an endless conveyor is at a loading position, the detecting system can become prohibitly expensive if that system requires duplication of all of the components on each movable object. On the other hand, it is sometimes desirable to know not only when the movable object is in a predetermined position, but also when a further object, carried by the movable object, is properly positioned on the movable object. More specifically, in the field of automobile parking systems (such as those disclosed in U.S. Pat. to Coursey, No. 2,874,822; Cooper et al, No. 2,578,046; Holappa No. 2,773,609; and Lichti, No. 3,656,608; all of which are incorporated herein by reference) it is necessary to know when the automobile is properly positioned on the supporting carriages, cradles, or conveyor pans. Both the Coursey patent and the Cooper et al patent disclose the use of conventional mechanical switches which are depressed by the tire of the automobile when the automobile is properly positioned. The compounding of costs is clearly disclosed by the duplication of components on each carriage 36 in the Coursey patent. The system of this patent also requires a complex series of contacts at each rest location in order to sense the signal generated on the movable carriage platform. In addition, conventional electromechanical switch systems are obviously prone to failure and breakage and other malfunctioning as a result of the accumulation of debris and other material inside the switch. Such a system with its complexity and large number of items can produce a maintenance nightmare.

Therefore, it is believed that none of the known conventional systems provide a reliable and simple position detector. Furthermore, none of the conventional systems provide a detector which is usable outside of enclosed areas or in areas where there is a large distance between the source and the detector.

SUMMARY OF THE INVENTION

The present invention provides a novel apparatus and a novel method for determining when a movable object is in a predetermined position. The present invention also provides a means for determining the location of a further object relative to or carried by the movable object.

It is a feature of the present invention that the location of a movable object is determined by the reception of electromagnetic radiation passing near or through the movable object from a source remote from the movable object. In addition, it is a feature of the present invention to use electromagnetic radiation which is polarized when it leaves the source and subsequently rotated as the radiation passes near or through the movable object. The detector of the present invention is adapted to receive only rotated radiation so that substantially only that radiation which is rotated by the movable object being at the predetermined position is detected.

It is also a feature of the present invention to use a microwave beam generation and detection system that can be interconnected with a microprocessor control system so that the radiation can be selectively generated and so that the reception of the detected signal can be properly interpreted. Obviously, the microprocessor control system can also be coordinated with other types of microwave and other detection systems, such as systems used for detecting the presence of people or, for example, the failure to properly close the door of an automobile to be transported.

It is another feature of one embodiment of the present invention to make use of the theory and principals of wave guides, but without the necessity of using expensive, fragile, precisely dimensioned, conventional waveguides. Conventional waveguides are simply highly conductive metallic tubes inside which electromagnetic waves can propagate through reflection from the inner surfaces. In order to minimize loses in conventional waveguides and to insure that the frequencies of the propagating wave are not cut off, the internal surfaces are usually made from copper and coated with gold or other precious metal and the tolerances of the internal and external dimensions are kept very small. The embodiment of the present invention, however, only involves the reception or non-reception of a transmitted microwave and therefore an inexpensive waveguide can be used having large tolerances and made from any lightweight conductive material, such as aluminum. Furthermore, in some embodiments of the invention, an inexpensive, hollow, conducting tube, such as a pipe, or a channel guide, can be used.

In a particular embodiment of the present invention, polarized microwave radiation is transmitted from a source to an aligned detector which can only detect radiation that is rotated a predetermined amount from the transmitted beam. A waveguide together with a portion thereof to rotate the beam is securely fastened to the movable object. Therefore, when the movable object is properly aligned between the transmitter and the receiver, the beam is properly rotated and detected by the detector. This system has the inherent advantage of requiring only relatively inexpensive parts to be duplicated on each of a plurality of movable objects, namely only the waveguide and rotator. There is no duplication of the more expensive parts of this system, namely the source, the detector, and the associated electronics. In addition, by using microwave radiation, relatively large gaps can be provided between the waveguide and the source and detector. In this way, large tolerances can be tolerated between the movable parts and the fixed parts of the system. Finally, microwave radiation has the advantages of immunity to interferences, can be used over relatively large distances, and can be easily maintained.

A further feature of another embodiment of the present invention is that means are provided on the movable object to block the transmission of the electromagnetic radiation. The blocking means is actuated by the positioning of another object relative to the first object. In one specific embodiment, the movable object can be a conveyor pan of an automobile storage system and the other object is the automobile itself. When the automobile is properly positioned on the conveyor pan, the tire of the automobile can actuate the blocking means, thereby indicating that the automobile is properly positioned. It can therefore be seen that the present system can use a microprocessor control system associated therewith to not only determine when the conveyor pan is properly positioned, but also when an automobile is properly positioned on top of the conveyor pan.

Other features, objects and advantages of the present invention are stated in or apparent from the presently preferred embodiments of the invention found hereinbelow.

DETAILED DESCRIPTION OF THE PREFERRED EMBODIMENT

Figure 1:
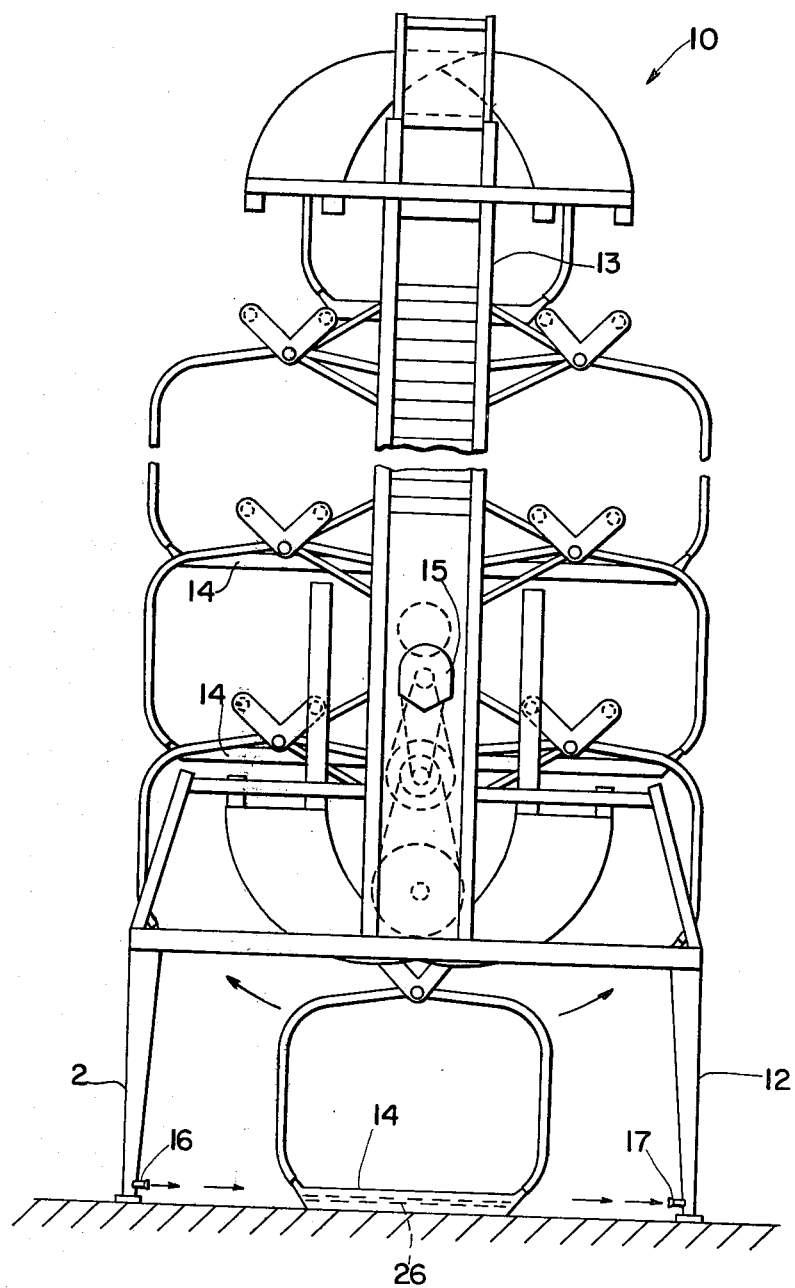
FIG. 1 is a front elevational view of an embodiment of a conveyor system which utilizes electromagnetic position detection of the conveyor pan and detection of a properly positioned object on top of the pan.

With reference now to the drawings in which like numerals represent like elements throughout the several views, a presently preferred embodiment of the present invention is depicted in FIG. 1 in combination with an automobile parking tower or car elevator 10. Car elevator 10 is only generally described and refer to U.S. Lichti Pat. No. 3,656,608, incorporated herein by reference, for greater details thereof. Elevator 10 is comprised of a base 12 which supports a vertically extending tower structure 13. Carried on tower structure 13 are a plurality of conveyor pans 14 and a suitable motor, generally designated at 15, is used to revolve conveyor pans 14 in a vertical plane about tower 13 by means of a conveyor belt and support members which are fully described in the aforementioned Lichti patent and need not be described in greater detail herein. Conveyor pans 14 move relative to base 12. Fixed to one side of base 12 is a source 16 of polarized electromagnetic radiation and opposite thereto and in line therewith is a detector 17 fixed to the other side of base 12 and which is capable of detecting only polarized electromagnetic radiation that has been rotated with respect to that emitted by source 16.

Figure 2:
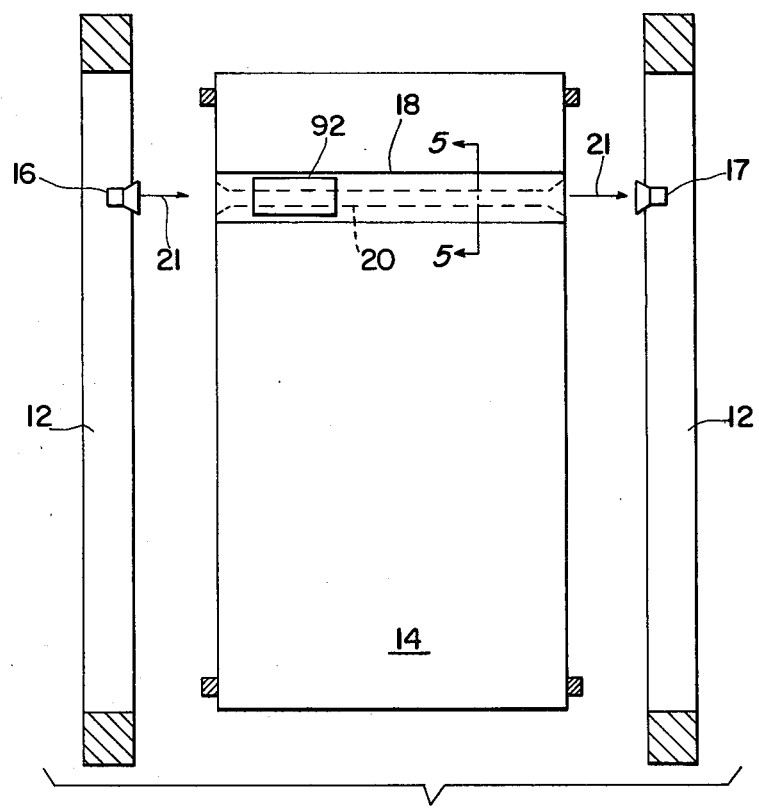
FIG. 2 is a schematic representation of a plan view of a conveyor pan and detection system of the present invention.

Referring now also to FIG. 2, a conveyor pan 14 is depicted in a loading/unloading position between the columns of base 12. Pan 14 is provided with a transversely extending wheel well 18, which can merely be a depression in pan 14, and which is used to keep the tire, and hence the car, in position on car pan 14. A car driven on pan 14 will be located in the proper position when the car tire thereof is located in wheel well 18.

Mounted below and extending parallel with wheel well 18 is a rectangular waveguide 20 which is rigidly attached to the bottom of pan 14. Thus, as depicted in FIG. 2, when car pan 14 is properly located in a loading/unloading position, waveguide 20 extends between but is spaced from, source 16 and detector 17. An arrow 21 indicates the path which microwaves travel when admitted from source 16 and are detected by detector 17. As is well known in the art, most waveguides are either rectangular or circular for propagating either linearly polarized electromagnetic radiation (polarized either vertically or horizontally) or circularly polarized electromagnetic radiation (polarized for either counterclockwise or clockwise rotation), respectively. It is also possible to have elliptically polarized electromagnetic radiation. Naturally, the internal shape of waveguide 20 depends upon and conforms to the type of polarization generated by source 16.

Figure 3:
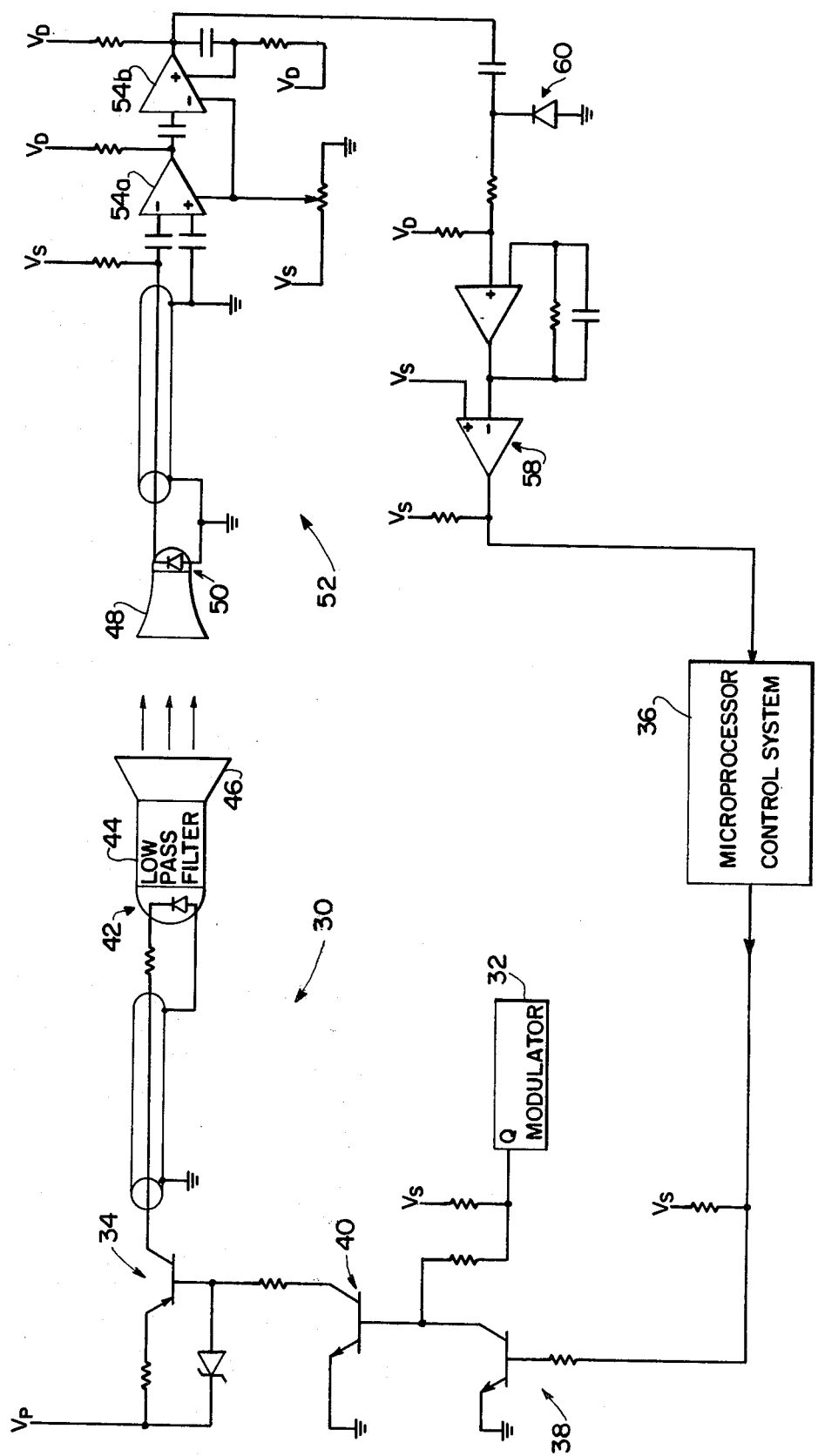
FIG. 3 is a schematic circuit diagram of a microprocessor controlled microwave transmission and detection system.

A microprocessor controlled system for generating and detecting microwaves which can be emitted by source 16 and detected by detector 17 is depicted in FIG. 3. An impatt diode oscillator 30 is used to produce 50 milliwatts of 10 GHZ microwave radiation which is amplitude modulated by a modulator schematically shown at 32 by switching a constant current driver 34 on and off at a desired modulation frequency, an exemplary frequency being 5 KHz. Modulator 32 can simply be a properly wired IC (integrated circuit) No. 74123 and an exemplary transistor driver that can be used for driver 34 is a 2N5415 type transistor. A microprocessor control system 36 is coupled in parallel with modulator 32 to driver 34 with grounded emitter, coupling transistors 38 and 40. Coupling transistors 38 and 40 can be, respectively, of the types 2N5172 and 2N3440. The output of driver 34 is connected to an impatt diode 42 which, when conducting current produces the desired microwave radiation. The output of impatt oscillator 30 is passed through a low pass filter 44 to eliminate the higher harmonics and then transmitted through a conventional 18 dB gain X-band horn 46 toward a receiving horn 48 which has been rotated approximately 90° from horn 46 and which is also an 18 dB horn.

The use of a modulator in oscillator 30 has at least two purposes. First, a modulator makes the microwave beam much easier to detect because the band width of the receiver can be constructed around the modulated frequency, thereby reducing receiver noise levels. The second purpose is to permit easy isolation of a plurality of microwave beams in one system from those of a nearby system by simply using different modulation frequencies. High gain horns are used to reduce the necessary system power requirements and to eliminate interference between separate beams.

Receiver horn 48 has a crystal detector 50 mounted thereon and which is maintained at a slight positive bias with a receiver circuit 52 so as to provide maximum sensitivity. Receiver circuit 52 has approximately a 60 dB gain which can be internally adjusted and comprises a pair of dual operational amplifiers 54a and 54b with automatic gain control. Operational amplifiers 54a and 54b can be the conventional 757 DM type dual operational amplifier. From the output of operational amplifier 54b, the received signal is sent first through a current amplifier 56 (for example of the type MC3301P) and thence to a impedance matching amplifier that has TTL output compatability (for example of the type MC3312P). Amplifiers 56 and 58 together with the depicted capacitors, resistors, and a diode 60 act as a Schmitt trigger to detect, filter and convert the received signal to a standard output TTL logic signal which is then fed to the microprocessor control system 36 to be decoded and interpreted.

If necessary, further isolation of the transmitted microwave beams from either the same system or a similar, adjacent system can be obtained by using the microprocessor to either selectively generate the microwave beams or to selectively sample the generated microwave beams. Because the microwave system of FIG. 3 uses modulated microwave radiation, simply by using higher modulation frequencies, a greater number of beams can be sampled without interference between the beams.

Figure 4:
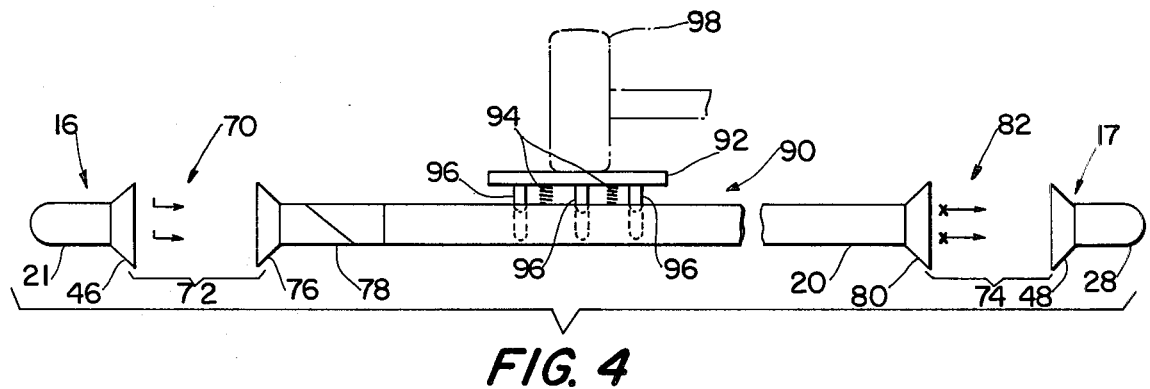
FIG. 4 is a schematic representation of a front elevational view of one embodiment of the electromagnetic radiation position detection of the present invention.
Figure 5:
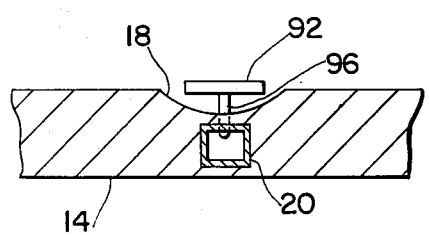
FIG. 5 is a cross-sectional view taken along line 5—5 of FIG. 2.

With reference now primarily to FIGS. 4 and 5, and to FIGS. 2 and 1 as necessary, the details of the microwave propagation system are shown. As mentioned above, source 16 includes a polarized, diverging horn 46 and which together provide a source of polarized microwaves, indicated schematically at 70 as having a given direction of polarization. Waveguide 20 is depicted spaced between source 16 and detector 17, thereby providing gaps 72 and 74, respectively. The polarized microwaves travel across gap 72 from source 16 and are received by a similarly polarized, converging horn 76 which gathers the microwaves and transmits them to waveguide 20 to which converging horn 76 is integrally mounted. Arbitrarily located along waveguide 20 (and shown in the FIG. 4 embodiment at a location adjacent horn 76) is a section 78 of the waveguide having a 90° twist. Twist section 78 causes a corresponding change or rotation in the polarization of the propagated microwaves. Waveguide twisting sections are well known in the art and can be comprised of a waveguide that has a physical twist in it or a well known rotator. The later type of microwave rotation means is disclosed in the U.S. Pat. to Rado, No. 2,832,938, incorporated herein by reference. Alternatively, as is also well known in the art, a sheet of a ferrite material can be used to rotate electromagnetic radiation, the amount of rotation depending upon the thickness of the sheet. In the case of elliptically or circularly polarized electromagnetic radiation, the E vector is constantly rotating and therefore a change in the direction, as opposed to a further rotation, of polarization is required. Such polarization changing means are also well known in the art.

The changed or rotated, polarized microwave radiation is then propagated through the remaining portion of waveguide 20 and is dispersed by a diverging horn 80 that is polarized in the same direction as the rotated microwaves are now polarized. From diverging horn 80, the rotated microwaves travel across gap 74 and are depicted schematically by arrows 82. Receiver horn 48 similarly has the same rotation as diverging horn 80 and gathers in the transmitted microwaves. As mentioned above, the rotated microwaves are then detected by receiver circuit 52.

Also depicted in FIG. 2 and FIG. 5 are presently preferred means 90 for selectively blocking the propagation of the microwaves through waveguide 20. Blocking means 90 is comprised of a plate 92 resiliently mounted by springs 94 in a withdrawn position in wheel well 18 of conveyor pan 14. Mounted onto the bottom of and depending from plate 92 are a plurality of metallic pins 96. Corresponding orifices in conveyor pan 14 and in the top of waveguide 20 permit the insertion of pins 96 whenever plate 92 is depressed by a force sufficient to overcome the force of springs 94. In the presently preferred, disclosed embodiment and use of the present invention, a tire 98 (shown in dashed lines) engages plate 92 when the automobile is properly positioned on conveyor pan 14. Obviously, the weight of the automobile is sufficient to insert pins 96 through the orifices. In the embodiment depicted in FIG. 4, pins 96 are linearly aligned and are spaced at intervals less than half of the wavelengths of the propagated microwave. It should be obvious that pins 96 cannot be spaced at halfway length intervals because this is the resonant spacing of the propagated wave and the pins would not interfere significantly with the propagation of the microwave. A spacing of approximately one centimeter or a quarter wavelength has been found to maximize the attenuation of the microwaves in an X-band waveguide. The quarter wavelength spacing places a short across the waveguide at a point where the field of the propagated electromagnetic wave would normally be a maximum. This causes almost total reflection of the incident radiation. The band of frequencies which are reflected by pins 96 can be widened or increased by using larger diameter pins. For example, to reflect the entire X-band region of microwaves (8.2-12.4 GHz), four millimeter diameter pins can be used.

Waveguide switches, in general, are well known in the prior art and a similar type of switch is depicted in the U.S. to Riblet, No. 2,955,268, incorporated herein by reference. Obviously, other waveguide switches can also be used, such as the switch depicted in the aforementioned Rado patent.

In operation, the position detection system functions in the following manner. Source 16 of polarized electromagnetic radiation is aligned and positioned opposite detector 17 which can detect only rotated polarized electromagnetic radiation. When a conveyor pan 14 is not properly positioned between source 16 and detector 17, detector 17 is unable to sense any microwaves emitted from source 16. As soon as a pan 14 is properly positioned waveguide 20 is aligned between source 16 and detector 17 and propagates the electromagnetic radiation emitted from source 16 so that detector 17 is able to detect the radiation. This assumes, however, that an automobile is not properly positioned on conveyor pan 14 and hence that blocking means 90 has not been rendered effective in preventing the propagation of the microwaves. As mentioned above, the present embodiment of the invention rotates the microwaves approximately 90°. However, adequate operation may be achieved from a rotation different from 90° so long as there is no ambiguity in the determination of the microwave.

Once pan 14, and therefore waveguide 20, is in a predetermined loading position, detector 17 will detect the rotated microwaves and receiver circuit 52 will send this information to microprocessor control system 36. When a tire 98 (preferably the front tire) of an automobile is driven onto pan 14 and into wheel well 18, plate 92 will be depressed. This causes pins 96 to be inserted into waveguide 20, thereby blocking the passage of the microwaves. As soon as this occurs, detector 17 stops receiving the rotated microwaves. Assuming that microprocessor control system 36 has been properly programmed, the initial reception of microwave radiation and the subsequent termination thereof is properly interpreted to first mean that conveyor pan 14 has been properly positioned at the loading/unloading position and then that an automobile has been properly positioned on top of conveyor pan 14.

Although the invention has been described in detail with respect to an exemplary embodiment thereof, it will be understood by those of ordinary skill in the art that variations and modifications may be effected within the scope and spirit of the invention. Thus, for example, the first aspect of the present invention relating solely to the proper positioning of a conveyor pan can be utilized with any type of conveyor system or any other system in which a plurality of articles are periodically positioned at a predetermined location. Such a system may or may not also take advantage of the blocking means aspect of the present invention. In addition, although the present invention has been described in particularity with respect to microwaves, it should be obvious that other types of electromagnetic radiation can be utilized. Other variations and modifications of the present invention are also possible.

I claim:

1. An electromagnetic radiation position detection system for detecting when a movable object is located at a predetermined position, said system comprising a source of polarized electromagnetic microwave radiation fixed relative to the movable object;

means, located on the movable object, for changing the polarization of the electromagnetic radiation;

detector means spaced from said source and fixed relative to the movable object for receiving radiation having said changed polarization such that substantially only that radiation which is detected and such that the polarization of said radiation is changed only when the object is in the predetermined position; and a waveguide rigidly attached to the object for propagating said microwave radiation, said waveguide extending between, but spaced from said source and said detector means when the object is located at the predetermined position.

2. An electromagnetic radiation position detection system as claimed in claim 1 and further comprising means for selectively blocking the propagation of the radiation through said waveguide.

3. An electromagnetic radiation position detection system as claimed in claim 1, further comprising
   means for selectively blocking the propagation of the microwave radiation through the waveguide, including a plurality of spaced apart conductive pins which are insertable as a group through apertures in said waveguide, said pin spacing being such that said pins are not all located at half wavelength intervals.

4. An electromagnetic radiation position detection system as claimed in claim 3, further comprising
   means for mounting said pins; and
   means to bias said mounting means in a pin withdrawn position, wherein said mounting means inserts said pins when a force sufficient to overcome said biasing means is exerted on the mounting means.

5. An electromagnetic radiation position detection system as claimed in claim 1, further comprising
   a source diverging horn located on said source to disperse said radiation issuing from said source towards said detector means,
   a detector converging horn located on said detector means to gather said radiation,
   a waveguide converging horn located on the end of said waveguide nearest said source,
   a waveguide diverging horn located on the end of said waveguide nearest said detector means,
   such that when the object is in a predetermined position said radiation issuing from said source diverging horn is gathered by said waveguide converging horn and propagated through said waveguide where it issues from said waveguide diverging horn and is ultimately gathered by said detector converging horn and detected.

6. An electromagnetic radiation position detection system as claimed in claim 1, wherein
   said polarization changing means rotates said radiation and comprises a twist in said waveguide.

7. An electromagnetic radiation position detection system as claimed in claim 6, wherein said waveguide is twisted about 90° such that said microwave radiation is rotated about 90°.

8. An electromagnetic radiation position detection system for detecting when a movable conveyor pan is located at a predetermined position, said system comprising a source of polarized electromagnetic radiation fixed relative to the movable conveyor pan;

means, located on the pan, for changing the polarization of the electromagnetic radiation; and detector means spaced from said source and fixed relative to the movable conveyor pan for receiving radiation having said changed polarization such that substantially only that radiation which is so changed is detected and such that the polarization of said radiation is changed only when the movable conveyor pan is in the predetermined position.

9. An electromagnetic radiation position detection system as claimed in claim 8, further comprising a plurality of movable conveyor pans, each conveyor pan having one of said polarization changing means attached thereto; and means, including a base to which said source and said detector are fixed, for moving said plurality of conveyor pans;

wherein the position of one conveyor pan is determined relative to said base.

10. An electromagnetic radiation position detection system as claimed in claim 8, wherein said source of polarized electromagnetic radiation is a source of microwave radiation, and further including a waveguide rigidly attached to the movable conveyor pan for propagating said microwave radiation, said waveguide extending between, but spaced from, said source and said detection means when the conveyor pan is located at a predetermined position.

11. An electromagnetic radiation position detection system as claimed in claim 10, and further comprising means for selectively blocking the propagation of the radiation through said waveguide.

12. An electromagnetic radiation position detection system as claimed in claim 10, further comprising means for selectively blocking the propagation of the microwave radiation through said waveguide, including a plurality of spaced apart conductive pins which are insertable as a group through apertures in said waveguide, said pin spacing being such that said pins are not located at half wavelength intervals.

13. An electromagnetic radiation position detection system as claimed in claim 12, further comprising means for mounting the pins; and means to bias said mounting means in a pin withdrawn position, wherein said mounting means inserts said pins when a force sufficient to overcome said biasing is exerted on said mounting means.

14. An electromagnetic radiation position detection system as claimed in claim 13, wherein the conveyor is for holding automobiles and wherein each conveyor pan includes a wheel well located above said waveguide and said mounting means is for being engaged by a tire of the automobile when the automobile is properly located in said wheel well and when so engaged, for inserting said pins into said waveguide, thereby blocking the propagation of said microwave radiation.

15. An electromagnetic radiation position detection system as claimed in claim 10, further comprising a source diverging horn located on said source to disperse said radiation issuing from said source towards said detector means, a detector converging horn located on said detector means to gather said radiation, a waveguide converging horn located on the end of said waveguide nearest to said source, a waveguide diverging horn located on the end of said waveguide nearest said detector means, such that when the object is in a predetermined position said radiation issuing from said source diverging horn is gathered by said waveguide converging horn and propagated through said waveguide where it issues from said waveguide horn and is ultimately gathered by said detector converging horn and detected.

16. An electromagnetic radiation position detection system as claimed in claim 10, wherein said polarization changing means comprises a twist in said waveguide and rotates said radiation.

17. An electromagnetic radiation position detection system as claimed in claim 16, wherein said twist in said waveguide is about 90° such that said microwave radiation is rotated about 90°.

18. A method for detecting the position of a movable object using electromagnetic radiation, comprising the steps of:

transmitting, from a fixed position relative to the object, polarized electromagnetic radiation;

propagating said electromagnetic radiation through a waveguide attached to the object;

changing the polarization of the electromagnetic radiation propagated through the waveguide; and detecting, from a fixed position relative to the object, said changed radiation;

such that substantially only that radiation which is propagated in said waveguide and the polarization of which has been changed is detected when the object is in an aligned position.

19. A method for detecting the position of a movable object using electromagnetic radiation as claimed in claim 18, further comprising the step of blocking, selectively, the propagation of the radiation through the waveguide.

20. A method for detecting the position of a movable object using electromagnetic radiation as claimed in claim 19, wherein polarized microwave radiation is transmitted, and the polarization of said radiation is changed by rotating said radiation.

* * * * *